(12) United States Patent
Quix et al.

(10) Patent No.: US 11,022,021 B2
(45) Date of Patent: Jun. 1, 2021

(54) METHODS AND SYSTEMS FOR A COOLING ARRANGEMENT

(71) Applicant: Ford Global Technologies, LLC, Dearborn, MI (US)

(72) Inventors: Hans Guenter Quix, Herzogenrath (DE); Bas van den Heuvel, Wijnandsrade (NL); Andreas Kuske, Geulle (NL); Wilbert Hemink, Landgraaf (NL); Christian Winge Vigild, Aldenhoven (DE)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 16/546,033

(22) Filed: Aug. 20, 2019

(65) Prior Publication Data

US 2020/0063636 A1    Feb. 27, 2020

(30) Foreign Application Priority Data

Aug. 22, 2018 (DE) .......................... 102018214152.5

(51) Int. Cl.
| | |
|---|---|
| *F01P 3/02* | (2006.01) |
| *F01P 5/10* | (2006.01) |
| *F01P 3/18* | (2006.01) |
| *F02M 26/32* | (2016.01) |
| *F01P 3/20* | (2006.01) |
| *F02F 1/16* | (2006.01) |
| *F02F 7/00* | (2006.01) |

(Continued)

(52) U.S. Cl.
CPC .................. *F01P 3/02* (2013.01); *F01P 3/18* (2013.01); *F01P 3/20* (2013.01); *F01P 5/10* (2013.01); *F01P 7/14* (2013.01); *F02B 29/0443* (2013.01); *F02F 1/16* (2013.01); *F02F 7/007* (2013.01); *F02M 26/32* (2016.02); *F01P 2003/027* (2013.01); *F01P 2003/185* (2013.01); *F01P 2005/105* (2013.01); *F01P 2005/125* (2013.01); *F01P 2007/143* (2013.01); *F01P 2007/146* (2013.01); *F01P 2023/08* (2013.01); *F01P 2025/50* (2013.01); *F01P 2037/02* (2013.01); *F01P 2060/02* (2013.01); *F01P 2070/52* (2013.01)

(58) Field of Classification Search
CPC ....... F01P 3/02; F01P 3/18; F01P 5/10; F02M 26/32
See application file for complete search history.

(56) References Cited

U.S. PATENT DOCUMENTS

| | | | | |
|---|---|---|---|---|
| 8,746,187 | B2 * | 6/2014 | Nogawa | F02F 1/40 123/41.82 R |
| 9,500,115 | B2 * | 11/2016 | Quix | F01P 3/02 |

FOREIGN PATENT DOCUMENTS

| | | |
|---|---|---|
| DE | 102008007766 A1 | 8/2009 |
| DE | 102011117102 A1 | 5/2012 |

(Continued)

*Primary Examiner* — Kevin A Lathers
(74) *Attorney, Agent, or Firm* — Geoffrey Brumbaugh; McCoy Russell LLP

(57) ABSTRACT

Methods and systems are provided for a cooling arrangement. In one example, the cooling arrangement comprises flowing coolant to only an upper portion of a cylinder head during a cold-start. The cooling arrangement comprises flowing coolant to a cylinder block, a lower portion of the cylinder-head, and the upper portion of the cylinder head outside of the cold-start.

20 Claims, 6 Drawing Sheets

(51) Int. Cl.
*F02B 29/04* (2006.01)
*F01P 7/14* (2006.01)
*F01P 5/12* (2006.01)

(56) References Cited

FOREIGN PATENT DOCUMENTS

| | | |
|---|---|---|
| DE | 112012005840 B4 | 10/2017 |
| DE | 102017123064 A1 | 11/2017 |
| DE | 102017202154 A1 | 8/2018 |
| WO | 2008080872 A1 | 7/2008 |
| WO | 2012035202 A1 | 3/2012 |

* cited by examiner

METHODS AND SYSTEMS FOR A COOLING ARRANGEMENT

CROSS REFERENCE TO RELATED APPLICATION

The present application claims priority to German patent application No. 102018214152.5, filed on Aug. 22, 2018. The entire contents of the above-listed application are hereby incorporated by reference for all purposes.

FIELD

The present description relates generally to a cooling arrangement for an engine.

BACKGROUND/SUMMARY

Engines may utilize various cooling jackets in the head and the block to provide cooling. However, there may be competing objectives for the cooling system relative to increasing engine efficiency and waste heat rejection, accelerating engine warm-up, maintaining temperature control, providing cabin heating, and the like.

During a warm-up phase (e.g., a cold-start), as a result of the increased internal friction, the cold vehicle engine may cause increased fuel consumption and a sub-optimal combustion process. Furthermore, in the case of engines comprising low-pressure exhaust gas recirculation systems, charge-air coolers are used to cool a mixture of intake air and recirculated exhaust gas. In this case, the recirculated exhaust gas contains water vapor which, under specific some conditions where a gas pressure and a gas temperature lead to the dew point for water being exceeded and the water vapor condensing. Inside the engine, a threshold amount of condensate can lead to misfiring, which is undesired. Therefore, in particular in the case of a cold start, measures are taken to supply additional heat which counteracts the condensation.

In other examples, a measure for improving the warm-up phase is what is known as the "no-flow strategy", that is to say blocking the flow of coolant. In the case of a normal cooling circuit, such measures cannot be used if a coolant flow to other systems is demanded (e.g. for exhaust gas recirculation or for heating). For this reason, what are known as split cooling systems have been developed which allow the flow to the engine block to be interrupted and at the same time allow the flow to the cylinder head or to parts of the cylinder head to be maintained. In internal combustion engines, split cooling systems are used which allow a coolant flow to a small part of the cylinder head while the coolant flow to the rest of the engine is interrupted. For a control of the flow which is independent of the main water pump, electric auxiliary pumps are used to allow a coolant flow in this small part of the cylinder head. However, as a result, the costs, weight and complexity of the cooling system as a whole are increased.

Previous examples include where modern internal combustion engines are further equipped with a low-temperature cooling circuit to cool the charge air via an indirect charge-air cooler (water-cooled charge air cooler; WCAC).

One example approach is shown by Contet in W.O. 2008/080872 A1. Therein, a high/low-temperature water cooling system comprises a high-temperature cooling circuit and a low-temperature cooling circuit. Furthermore, the system comprises a water-cooled charge-air cooler, a low-temperature heat exchanger, and a pump having a pump inlet and a pump outlet. In addition, a directional valve is provided which has a first connection which is connected to the low-temperature heat exchanger, a second connection which is connected to a bypass which bypasses the low-temperature heat exchanger, a third connection which is connected to the pump outlet, and a fourth connection which is connected to a circuit outlet of the low-temperature cooling circuit. The directional valve is set up, in a warm-up mode, to block the first and third connections and to interconnect the second and fourth connections, and in a cooling mode, to connect the first and third connections and to block the second and fourth connections.

Another example is shown by Thewes in DE102017123064A1. Therein, an internal combustion engine comprises a charge-air cooler for cooling charge air, a low-temperature circuit which is connected to the charge cooler to cool the charge air, and a high-temperature circuit which is connected to the charge air cooler to warm up the charge air.

Another example is shown by Breymayer et al. in DE102011117102 A1 discloses a circuit arrangement for cooling drive components of a motor vehicle comprising a high-temperature circuit and a low-temperature circuit having an internal combustion engine which has a cylinder head having a two-part coolant jacket. The high-temperature circuit and the low-temperature circuit are coupled to one another at least in some portions in such a way that a coolant circulates in both circuits, and the low-temperature circuit opens into an outlet of the cylinder head or in the flow direction after the cylinder head into the high-temperature circuit.

Another example is shown by Kalax in WO2012/035202A1. Therein a cooling system for an internal combustion engine comprises a low-temperature cooling circuit and a high-temperature cooling circuit, and a circulating pump for circulating coolant in the low-temperature cooling circuit. In this case, it is provided that the cooling system comprises a turbine-driven pump unit for circulating coolant in the high-temperature cooling circuit, wherein the pump unit has a turbine which is connected to the low-temperature cooling circuit and a pump which is connected to the high-temperature cooling circuit.

Another example is shown by Quix et al. in U.S. Pat. No. 9,500,115 B2. Therein, an internal combustion engine comprises a cylinder head equipped with an integrated coolant jacket, which has a first supply opening and a first discharge opening, and comprising a cylinder block which is equipped with an integrated coolant jacket, which has a second supply opening and a second discharge opening, wherein the discharge openings can be connected to the supply openings to form a coolant circuit. The second discharge opening can be connected to the second supply opening via a recirculation line in which a heat exchanger is arranged. The second discharge opening can be connected to the second supply opening via a bypass line. The first discharge opening can be connected at least to the first supply opening via a heating circuit line in which a vehicle interior heater is arranged. Upstream of the supply openings, a common pump for conveying coolant to the two supply openings is provided.

However, the inventors have identified some issues with the approaches described above. The no flow strategy may not be viable if components of along the cooling arrangement demand coolant. For a split flow coolant system, where coolant flow to the engine block is blocked and flow to the head or parts of the head is permitted, independent flow control is needed, separate from a primary pump, to enable coolant flow to the head without flowing to the block. This results in additional cost, weight, and complexity of the cooling arrangement. Thus, there is a demand for the improvement of the reliability and efficiency of supercharged internal combustion engines, in particular under cold-start conditions.

In one example, the issues described above may be at least partially solved by a cooling arrangement for an engine comprising a high-temperature cooling circuit comprising a primary pump and a low-temperature coolant circuit comprising a secondary pump smaller than the primary pump and a controller with computer-readable instructions stored on non-transitory memory thereof that when executed enable the controller to activate the secondary pump and deactivate the primary pump during an engine cold-start, wherein coolant only flows through an upper cylinder-head portion separate from coolant jackets of the engine block and a lower cylinder-head portion. In this way, a charge air cooler may be warmed up more quickly during a cold-start, which may mitigate condensate formation.

It should be noted that the features and measures individually listed in the following description can be combined in any technically expedient manner and demonstrate further embodiments of the disclosure. The description, in particular in conjunction with the drawings, additionally characterizes and gives details of the disclosure.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
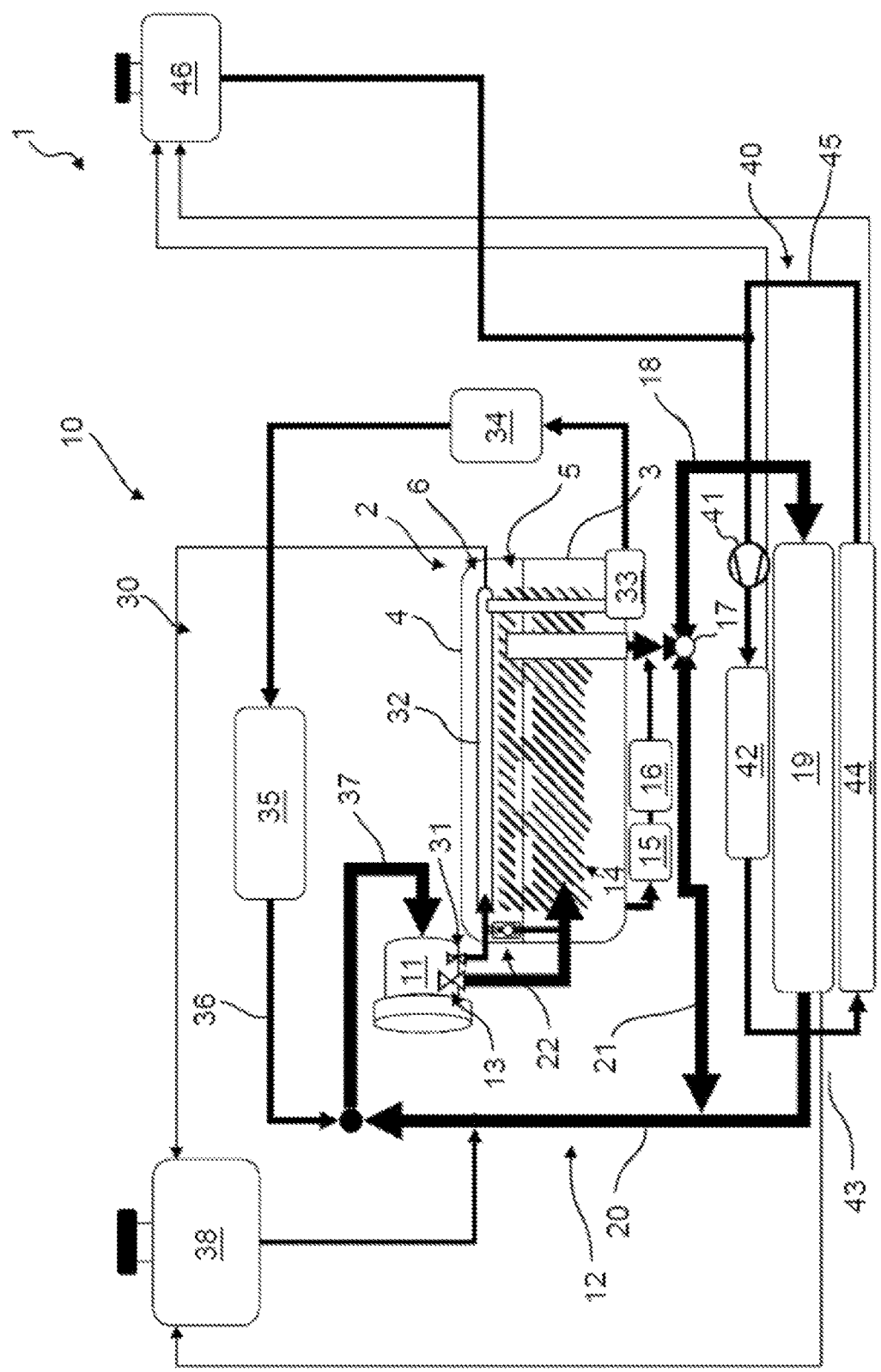
FIG. 1 shows a schematic view of a cooling system according to the previous examples described above.
Figure 2:
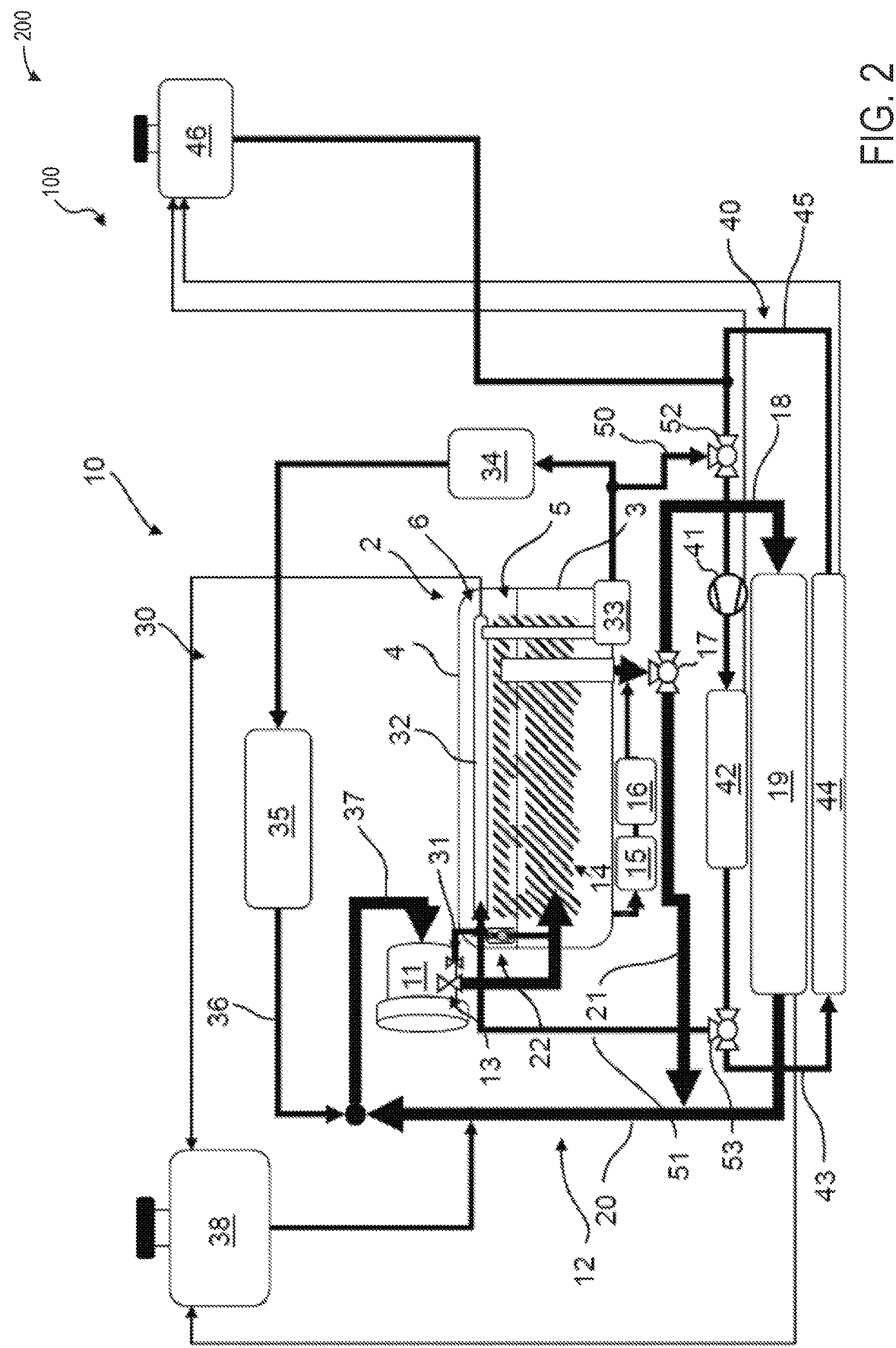
FIG. 2 shows a schematic view of a first embodiment of a cooling system according to the disclosure in a normal mode.
Figure 3:
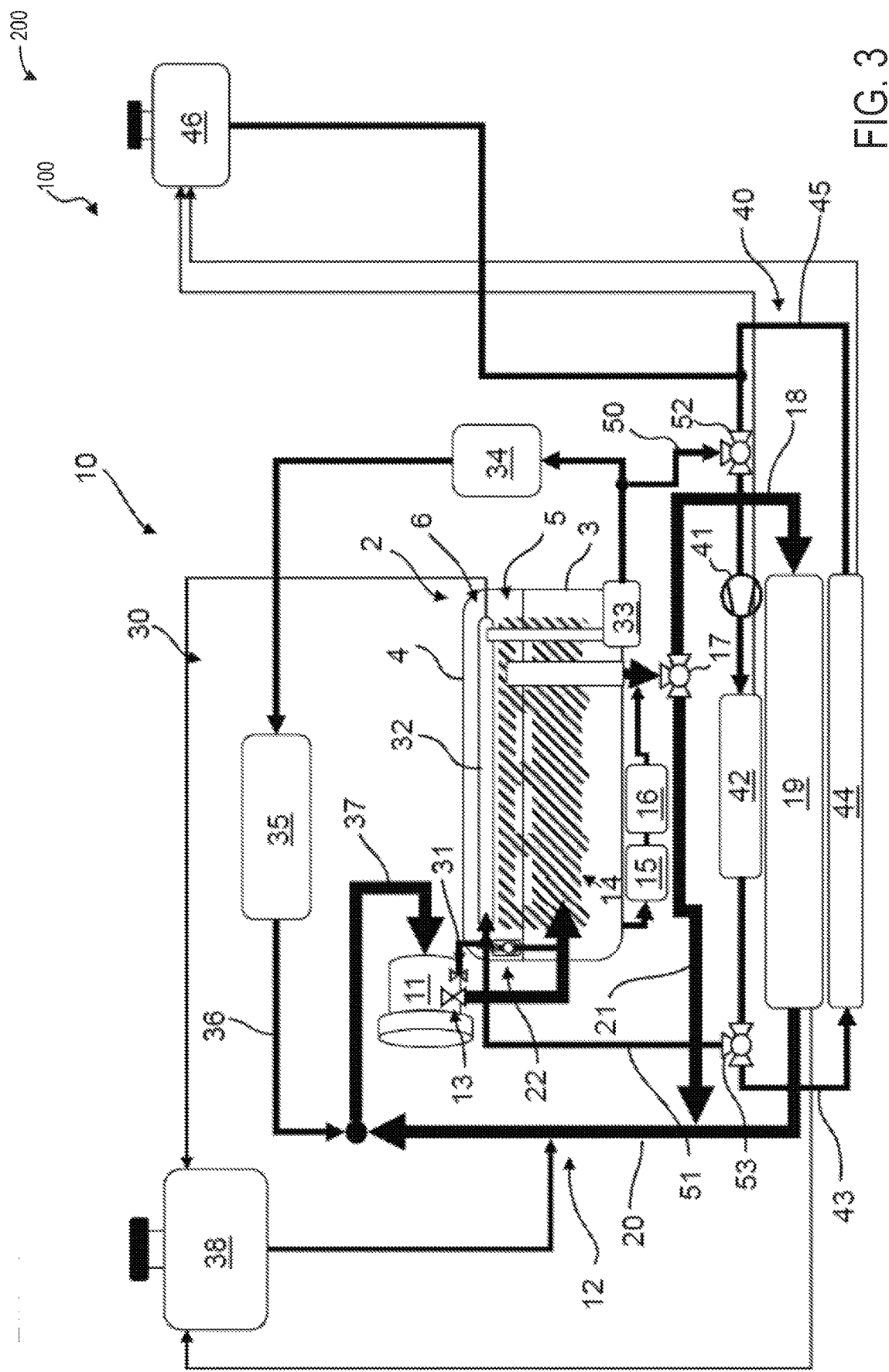
FIG. 3 shows a schematic view of the cooling system from FIG. 2 in a cold-start mode.
Figure 4:
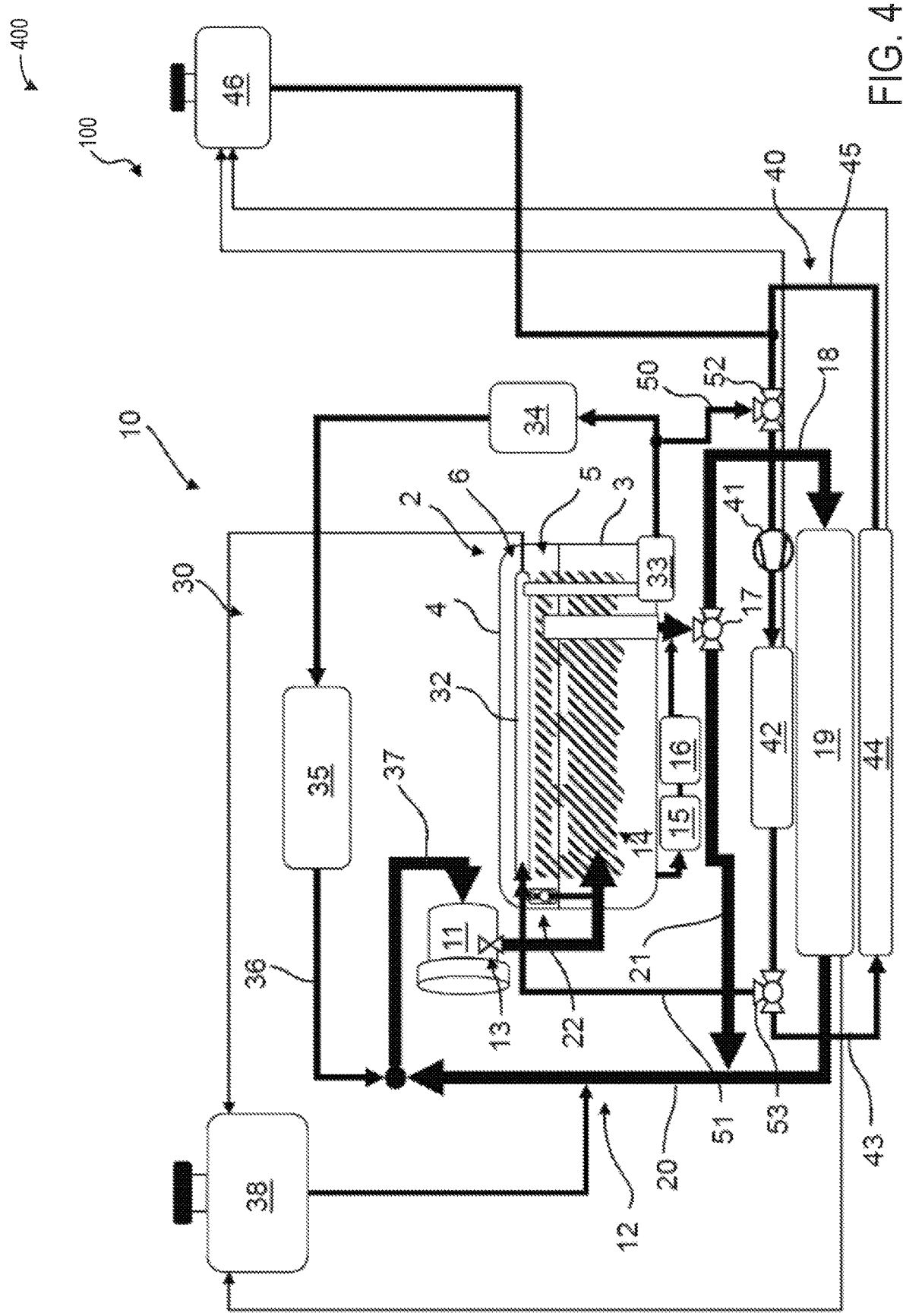
FIG. 4 shows a schematic view of a second embodiment of a cooling system according to the disclosure in a cool-start mode.

The following description relates to systems and methods for a split flow cooling arrangement. A previous example of a split flow cooling system is illustrated in FIG. 1. The present disclosure, as shown in FIGS. 2, 3, and 4, provides a cooling arrangement where after an engine cold start, a low-temperature cooling system is coupled to a small part of a cylinder head separated from the engine block and remaining cylinder head water jacket. By doing this, heating of a charge-air cooler, such as a water charge-air cooler (WCAC), may occur faster during the cold-start via waste heat from the cylinder head. The coolant flow to the cylinder head during the cold-start may be performed with the main coolant pump, thereby reducing cost, weight, and complexity of the cooling arrangement by avoiding inclusion of an additional pump. Additionally or alternatively, the cooling arrangement of the present disclosure may decrease power consumption of the main coolant pump as the main coolant pump may be switched off for a longer period of time. For example, the main coolant pump may be maintained off following the WCAC reaching a desired temperature as the exhaust ports are already receiving coolant. This decreases friction and improves fuel economy of an engine such as the engine of FIG. 5. FIG. 6 illustrates a method for operating the cooling system.

Additionally or alternatively, a system comprises a cooling system for an internal combustion engine. The internal combustion engine can be in particular a diesel engine of a motor vehicle.

The cooling system has a high-temperature cooling circuit, which has a primary pump, a first circuit branch for cooling an engine block and a first cylinder-head portion, and a second circuit branch for cooling a second cylinder-head portion. In one example, the primary pump is a mechanical pump which may be mechanically coupled to the internal combustion engine. During operation, the primary pump is used to pump a coolant (for example, a water/glycol mixture) through the high-temperature cooling circuit. In this case, it is possible to distinguish between a first circuit branch and a second circuit branch inside the high-temperature cooling circuit. The term "circuit branch" in this case implies that the high-temperature cooling circuit is branched, that is to say that the first and second circuit branches extend in parallel with one another. The branches can initially start jointly from the primary pump and branch off at a point located downstream or can start from the primary pump in an already separate state. Said branches can also join together upstream of the primary pump or open into the primary pump separately.

The first circuit branch is configured to cool an engine block and a first cylinder-head portion, that is to say that said branch passes the engine block and the first cylinder-head portion or is guided therethrough. Normally, said branch has a coolant jacket of the engine block and a coolant jacket of the first cylinder-head portion or a common coolant jacket of the engine block and the first cylinder-head portion. The first cylinder-head portion can be in particular a lower cylinder-head portion, that is to say a cylinder-head portion adjoining the engine block. The second coolant branch is designed to cool a second cylinder-head portion, that is to say is guided through the second cylinder-head portion or passes said portion. Normally, said branch has a coolant jacket of the second cylinder-head portion. The second cylinder-head portion can be in particular an upper cylinder-head portion, that is to say a cylinder-head portion facing away from the engine block. It is also conceivable for the first cylinder-head portion to be arranged at the inlet, whereas the second cylinder-head portion is arranged at the outlet. Combinations are also possible, that is to say at the bottom/top and/or at the inlet/outlet. Normally, the high-temperature cooling circuit has a high-temperature heat exchanger which can be for example an air-cooled heat exchanger in the front vehicle region. Optionally, both the first and the second circuit branch can have additional elements. Thus for example the first circuit branch can pass through a transmission oil cooler and/or a combination module, having an oil filter and an oil cooler (OFCA=oil filter cooler assembly), in parallel or in series with the engine block.

Furthermore, the cooling system has a low-temperature cooling circuit which has a secondary pump, a low-temperature cooler, and a charge-air cooler. In this case, the secondary pump may be an electric pump which can be fed for example through a vehicle battery. In normal operation, the secondary pump is provided to pump a coolant through the low-temperature cooling circuit. In this case, the coolant in the low-temperature cooling circuit may be identical to that in the high-temperature cooling circuit. The two cooling circuits can be operated separately from one another, since each of the cooling circuits has its own pump. In normal operation, the two cooling circuits are also conventionally separate from one another, that is to say that no coolant exchange takes place between the two circuits. Normally, the low-temperature cooling circuit has a low-temperature heat exchanger which can likewise be for example an air-cooled heat exchanger in the front vehicle region. Thus, while the coolants of the low and high temperature cooling circuits are identical, their temperatures are not.

In a cold-start mode, a coolant flow through the first circuit branch is interrupted. That is to say that the cooling system is designed for a cold-start mode in which no coolant flows through the first circuit branch and therefore, no coolant flows to the engine block. The term "cold-start mode" is not to be interpreted in a limiting manner to the effect that said mode is compulsorily adopted only during a cold start of the internal combustion engine or compulsorily at each cold start of the internal combustion engine. However, the cold-start mode can be adopted in particular in the event of a cold start and/or in the event of cold outdoor temperatures. In this case, the internal combustion engine is still not heated up, and therefore cooling of the engine block and of the first cylinder-head portion would be undesired and even counterproductive, for example since the viscosity of lubricants would be disadvantageously affected. To prevent this, no coolant is pumped through the first circuit branch in the cold-start mode. Apart from a cold start, the cold-start mode can be adopted for example in the event of low ambient temperatures or in the event of a low engine load.

According to the disclosure, in the cold-start mode, the second circuit branch is connected to the low-temperature cooling circuit to produce a coolant flow from the second cylinder-head portion to the charge-air cooler via the secondary pump. That is to say that, in the cold-start mode, a connection is produced between the second circuit branch and the low-temperature cooling circuit, through which connection coolant can be transmitted. Thus, through the coolant flow, heat can be transmitted from the second cylinder-head portion to the charge-air cooler. The effects achieved as a result are twofold. Firstly, a cooling of the second cylinder-head portion can be achieved without involving the primary pump, since the coolant flow is produced via the secondary pump. The second cylinder-head portion is protected against overheating without the primary pump having to pump coolant for this purpose. As a result, undesired friction losses in the region of the primary pump are prevented, which would otherwise be solely necessary for cooling the second cylinder-head portion. Secondly, heating of the charge-air cooler is achieved. It could also be said that the charge-air cooler is used in the cold-start mode not for cooling but for heating of the charge air. As a result, moisture can for example be prevented from condensing out, which moisture is contained either in the charge air itself or in particular in exhaust gases which are recirculated into the engine and mixed with the charge air in the process. As a result, for example misfirings in the engine as a result of condensing moisture can be prevented. Since the secondary pump which is already present is used to generate the coolant flow, no additional pump unit is needed, which would increase the costs, weight and complexity of the system. In addition, the EGR acceptability of the combustion is increased, which is not the case at low temperatures. Said another way, EGR may be utilized during combustion earlier due to the cooling arrangement of the present disclosure.

It is understood that in a normal mode which is different from the cold-start mode, firstly, a coolant flow is released in the first circuit branch, and secondly, the second circuit branch is separated from the low-temperature cooling circuit, that is to say the above-mentioned conditions apply only in the cold-start mode. Switching between the normal mode and the cold-start mode can be carried out for example by a superordinate control unit, which measures various parameters such as the external temperature or the temperature in different parts of the engine via sensors and adjusts the respective mode according to these measured parameters. As such, the normal mode includes engine operating parameters outside of the cold-start mode.

Preferably, the primary pump is deactivated in the cold-start mode. That is to say for example a connection of the primary pump to the first circuit branch is not interrupted, but the coolant flow is interrupted as a result of the fact that the primary pump itself is switched off, for example as a result of the fact that a mechanical connection to the internal combustion engine is disconnected. As already shown above, by deactivating the primary pump, unnecessary friction losses which would have a disadvantageous effect overall on the efficiency of the connected internal combustion engine can be mitigated. Shutting off the coolant flow via a valve also leads to a reduction in the pump drive power. The coolant flow is expediently shut off behind the pump impeller. That is to say that the pump is still driven but is not conveying.

In some examples, a first connecting line may branch off from the second circuit branch downstream of the second cylinder-head portion and open into a first directional valve which is arranged in the low-temperature cooling circuit upstream of the secondary pump and the charge-air cooler, and for a second connecting line to branch off from a second directional valve downstream of the secondary pump and the charge-air cooler and open into the second circuit branch upstream of the first cylinder-head portion. The two directional valves can be in particular in the form of 3/2-way valves, that is to say can have three connections and two settings. The first and second connecting lines are used overall to connect the second circuit branch to the low-temperature cooling circuit. In this case, the first connecting line is used to transfer coolant from the second circuit branch to the low-temperature cooling circuit, whereas the second connecting line is used to transfer coolant from the low-temperature cooling circuit to the second circuit branch. The first connecting line branches off from the second circuit branch downstream of the second cylinder-head portion and opens into the first directional valve. In a suitable setting, said valve provides a connection to the low-temperature cooling circuit, the coolant being pumped via the secondary pump located downstream of the first directional valve through the charge-air cooler which is likewise located downstream. In this case, heat stored in the coolant is released to the charge-air cooler and thus to the charge air, which can also be mixed with recirculated exhaust gases. In this embodiment and also generally within the scope of the invention, the sequence of the secondary pump and the charge-air cooler inside the low-temperature cooling circuit is as desired. The second directional valve from which the second connecting line branches off is arranged downstream of the secondary pump and the charge-air cooler. In the case of a suitable setting of the second directional valve, the coolant flows via said connecting line back into the second circuit branch. In the latter, said coolant is pumped onwards through the second cylinder-head portion, where said coolant can absorb heat again. It is understood that the two directional valves can be controlled for example electrically by a superordinate control device so that both release the connecting lines at the same time.

Preferably, in the cold-start mode, a coolant flow between the charge-air cooler and a low-temperature heat exchanger of the low-temperature cooling circuit through the first and second directional valves is interrupted, whereas a coolant flow through the connecting lines is released. For example, when the internal combustion engine is strongly heated, it is necessary to cool the charge air, which is the actual function of the charge-air cooler. In this process, heat is released from the charge air to the coolant in the low-temperature cooling circuit. Said coolant circulates and in turn releases the heat to a low-temperature heat exchanger, which can be mounted for example on the front side of the vehicle and for its part can be cooled by external air. In the cold-start mode, such cooling of the charge-air cooler may be counterproductive. Therefore, the coolant flow between the charge-air cooler and the low-temperature heat exchanger must be at least reduced, or preferably completely stopped. In this embodiment, this is achieved by the first and second directional valves. It could also be said that, in the cold-start mode, these two directional valves switch the coolant flow running through the charge-air cooler into the second circuit branch so that the low-temperature heat exchanger is bypassed. In the above-mentioned normal mode, however, the coolant flow is conveyed from said directional valves through the low-temperature heat exchanger.

In some examples, the high-temperature cooling circuit and in this case in particular the first circuit branch downstream of the engine block pass through a high-temperature heat exchanger. In this case, said heat exchanger is normally an air-cooled heat exchanger in the front region of the vehicle. According to one preferred embodiment, the first circuit branch downstream of the engine block and the first cylinder-head portion has a third directional valve, by which coolant flows, which flow firstly through the high-temperature heat exchanger and secondly through a bypass line bypassing the high-temperature heat exchanger, can be changed. That is to say that, by adjusting the third directional valve, it is possible to affect the extent to which the coolant in the first circuit branch is cooled by the high-temperature heat exchanger. The third directional valve can be for example a thermostat valve with a wax or other temperature sensitive element. Coolant which bypasses the high-temperature heat exchanger via the bypass line is of course not cooled or cooled to only a minimal extent before being supplied back to the primary pump. Normally, the setting of the third directional valve is dependent on the temperature of the engine block and/or of the first cylinder-head portion. In the case of a high temperature, all the coolant or at least a relatively large part thereof can be guided through the high-temperature heat exchanger, whereas in the case of a low temperature, all the coolant or a relatively large part thereof can be directed through the bypass line past the high-temperature heat exchanger.

According to one embodiment, the primary pump has a controllable primary connection for the first circuit branch and a controllable secondary connection for the second circuit branch. That is to say that the first circuit branch and the second circuit branch are connected to the primary pump via two connections which can be controlled independently of one another. In this way, it is possible to control the coolant flows through the first and second circuit branches separately from one another. In this case, controllable in the broadest sense is defined to mean that the coolant flow passing through each connection can at least be interrupted and released, the flow also being able to be adjusted if necessary.

According to an alternative embodiment, the primary pump has a controllable primary connection for the first circuit branch and for the second circuit branch. That is to say that, in this embodiment, which can be considered to be simplified in comparison with the embodiment described previously, at least on the pump side, it is not possible to control the coolant flow in the first and second circuit branches separately, but rather only jointly.

To firstly allow for coolant coming from the primary pump to pass in part from the first circuit branch into the second circuit branch, and secondly to block coolant coming from the low-temperature cooling circuit from draining out of the second circuit branch into the first circuit branch, it is desired for the first circuit branch and the second circuit branch to be interconnected downstream of the primary pump via a non-return valve opening to the second circuit branch. Said non-return valve prevents coolant from draining into the first circuit branch and allows the second circuit branch to be operated independently of the first circuit branch.

The second circuit branch can be used to cool or heat different elements. In particular, said branch can pass through an exhaust gas recirculation valve, an exhaust gas recirculation cooler and/or a HVAC system. In the case of the exhaust gas recirculation valve and the exhaust gas recirculation cooler, the function thereof in normal operation consists in cooling the corresponding elements. However, heating of the exhaust gas recirculation valve or of the exhaust gas recirculation cooler can also take place if necessary, heat absorbed in the second cylinder-head portion beforehand being released. In the case of the HVAC system (heating, ventilation and air-conditioning), primarily a heating function is provided in each case. It could also be said that the HVAC system functions as a cooler for the second circuit branch, where at least some of the heat absorbed at the second cylinder-head portion is released.

The first connecting line can branch off from the second circuit branch immediately downstream of the second cylinder-head portion or immediately downstream of the exhaust gas recirculation valve. In this case, the exhaust gas recirculation cooler and the HVAC system, if these are passed through by the second circuit branch, are excluded from the coolant flow in the cold-start mode. Alternatively, however, it is also conceivable for the first connecting line to branch off from the second circuit branch downstream of the exhaust gas recirculation cooler and/or downstream of the HVAC system. If the first connecting line branches off for example downstream of the exhaust gas recirculation cooler, but upstream of the HVAC system, then in the cold-start mode, for example temperature control, that is to say cooling, of the recirculated exhaust gases can take place. If the first connecting line branches off downstream of the HVAC system, for example a vehicle heater can also be operated in the cold-start mode using heat which comes from the second cylinder-head portion and optionally from the exhaust gas recirculation cooler. This can be advantageous in some cases, and in other cases it may be preferable for no heat to be extracted from the coolant before said coolant reaches the charge-air cooler.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, it shows a schematic view of a cooling system 1 for an internal combustion engine 2, for example a diesel engine of a motor vehicle. The internal combustion engine 2 has an engine block 3 and a cylinder head 4 which is connected thereto. Said cylinder head in turn has a first, lower cylinder-head portion 5 and a second, upper cylinder-head portion 6, the lower cylinder-head portion 5 sandwiched between the engine block 3 and the upper cylinder-head portion 6. The internal combustion engine 2 is cooled primarily via a high-temperature cooling circuit 10, which is operated via a primary pump 11, which can be mechanically coupled to the internal combustion engine 2. Additionally or alternatively, the primary pump may be electrically, hydraulically, or pneumatically powered.

The high-temperature cooling circuit 10 has a first circuit branch 12 and a second circuit branch 30. The primary pump 11 has a controllable primary connection 13 for the first circuit branch 12. As a result, at least the coolant flow in the first circuit branch 12 can be released or blocked, or its flow rate may also be adjusted. The coolant flow runs onwards to a first coolant jacket 14 which cools the engine block 3 and the lower cylinder-head portion 5. Part of the coolant flow is branched off and passes through a transmission oil cooler 15 and an oil filter 16. The coolant flow then leads to a bypass directional valve 17, via which all or a portion of said flow can be conveyed either to a heat-exchanger line 18 or to a bypass line 21. The heat-exchanger line 18 leads to a high-temperature heat exchanger 19, which is conventionally an air-cooled heat exchanger arranged in the front region of the vehicle. It is understood that in said heat exchanger, heat is extracted from the coolant, which has been heated in advance on the engine block 3, on the lower cylinder-head portion 5, on the transmission oil cooler 15 and on the oil filter 16, before said coolant leaves the high-temperature heat exchanger 19 towards the primary pump 11 via a first return line 20.

The second circuit branch 30 is connected to the primary pump 11 via a controllable secondary connection 31. Said branch successively passes through a second coolant jacket 32, which cools the upper cylinder-head portion 6, an exhaust gas recirculation (EGR) valve 33, an exhaust gas recirculation cooler 34 and a heating, ventilation, and air-conditioning (HVAC) system 35. In this case, the coolant absorbs heat in the second coolant jacket 32, at the exhaust gas recirculation valve 33, and at the exhaust gas recirculation cooler 34, all or some of which heat can be released to the HVAC system 35 to heat the inside of the motor vehicle. The coolant leaves the HVAC system 35 via a second return line 36, which opens, together with the first return line 20, into a third return line 37, which leads back to the primary pump 11. Since the two coolant flows from the first circuit branch 12 and from the second circuit branch 30 join together again here, the coolant can also be cooled exclusively via the high-temperature heat exchanger 19 when for example the heater of the HVAC system 35 is switched off. Upstream of the first and the second coolant jackets 14, 32, the first and second circuit branches 12, 30 are connected via a non-return valve 22 which opens to the second circuit branch 30. Via the non-return valve 22, it is possible for coolant to be released from the first circuit branch 12 to the second circuit branch 30, but not vice versa. Furthermore, the high-temperature cooling circuit 10 is connected to a first degassing container 38. As such, the non-return valve 22 may be configured to allow coolant to only flow one-way from the first circuit branch 12, which flows coolant to the first coolant jacket 14, to the second circuit branch 30, which flows coolant to the second coolant jacket 32. The lower cylinder-head portion 5, and therefore the first coolant jacket 14 may be adjacent to one or more of the intake valves, the intake valve seats, the exhaust valves, the exhaust valve seats, the lower portion of the valves stems, and the like. The upper cylinder-head portion 6, and therefore the second coolant jacket 32, may be adjacent to one or more of the rocker arms and/or tappets, linkages, the fuel injector, the cam shaft, and the like.

In addition, the cooling system 1 has a low-temperature cooling circuit 40 which is equipped with an electrically operated secondary pump 41. A charge-air cooler 42 is connected via a supply line 43 to a low-temperature heat exchanger 44, which in turn is connected via a fourth return line 45 to the secondary pump 41 and the charge-air cooler 42. In this case, the low-temperature cooling circuit 40 is completely separated from the high-temperature cooling circuit 10, and therefore no coolant exchange can take place between the two cooling circuits 10, 40. However, in both cooling circuits 10, 40, the same coolant, for example a water/glycol mixture, can be used. The coolant in the low-temperature cooling circuit 40 is circulated through the secondary pump 41, said coolant absorbing heat in the charge-air cooler 42, then entering the low-temperature heat exchanger 44 via the supply line 43, where said coolant releases at least some of the heat again, and arrives back at the charge-air cooler 42 via the return line 45. In this case, the low-temperature cooling circuit 40 is connected to a second degassing container 46.

Under specific conditions, for example in the case of a cold-start of the internal combustion engine 2, cooling of the engine block 3 and of the lower cylinder-head portion 5 is generally unnecessary, and therefore the first circuit branch 12 can remain closed. At the same time, however, cooling of the upper cylinder-head portion 6 and thus operation of the second circuit branch 30 is desired. However, for this purpose, the primary pump 11 is also operated, which leads to unwanted friction losses and thus to poorer efficiency of the internal combustion engine 2. At the same time, there is the problem that in the case of a cold-start and/or a particularly low ambient temperature, the charge-air has such a low temperature (e.g., lower than a threshold temperature) that when said air is combined with exhaust gases from the exhaust gas recirculation system, condensation of moisture may occur and may be swept to the engine. This can lead in turn to misfirings of the internal combustion engine 2.

The above-mentioned disadvantages of the previous example illustrated in FIG. 1 are mitigated in the case of the cooling systems 100 according to the disclosure which are shown in FIGS. 2 to 4. Components previously introduced may be similarly numbered in FIG. 2 and in subsequent figures.

Turning to FIGS. 2 and 3, they show a first embodiment 200 of a cooling system 100 according to the disclosure. In contrast with the cooling system 1 of FIG. 1, a first connecting line 50 branches off from the second circuit branch 30 between the exhaust gas recirculation valve 33 and the exhaust gas recirculation cooler 34. Said line opens into a first 3/2-way valve 52, which is arranged upstream of the secondary pump 41 and the charge-air cooler 42 in the low-temperature cooling circuit 40. Downstream of the secondary pump 41 and the charge-air cooler 42, a second 3/2-way valve 53 is provided, from which a second connecting line 51 leads to the second circuit branch 30 and opens into said branch upstream of the second coolant jacket 32. FIG. 2 shows a normal mode of the cooling system 1 outside of a cold-start mode, in which a coolant flow through the supply line 43 and the fourth return line 45 is released by the 3/2-way valves 52, 53, whereas a coolant flow through the connecting lines 50, 51 is blocked. Here and in the following, those parts of the cooling system through which no flow takes place, even when said parts are filled with coolant, are shown in each case by lighter or dashed lines. In the normal mode, the function of the cooling system 100 shown here does not differ from that shown in FIG. 1.

FIG. 3 illustrates an example of the cooling system 100 in a cold-start mode. In this cold-start mode, firstly the primary pump 11 is deactivated, and the primary and secondary connections 13, 31 can be closed. Through this measure, a coolant flow in the first circuit branch 12 and in parts of the second circuit branch 30 is blocked. Since the primary pump 11 remains deactivated, no unnecessary friction losses occur and energy is conserved, allowing the engine 2 to warm up more quickly compared to previous examples.

Furthermore, in the cold-start mode, the setting of the 3/2-way valves 52, 53 is changed in such a way that a coolant flow between the charge-air cooler 42 and the low-temperature heat exchanger 44 is blocked, whereas a coolant flow through the connecting lines 50, 51 is allowed. Coolant thus flows, driven by the secondary pump 41, firstly through the charge-air cooler 42 and from said cooler via the second 3/2-way valve 53 and the second connecting line 51 to the second coolant jacket 32, where said coolant absorbs heat from the upper cylinder-head portion 6. Via a coolant passage of the exhaust gas recirculation valve 33, the coolant flows onwards to the first connecting line 50 branching off, and via the first 3/2-way valve 52 back into the return line 45. Through said return line, the coolant arrives back at the charge-air cooler 42, where said coolant releases some of the heat absorbed at the upper cylinder-head portion 6.

Thus, firstly, effective cooling of the upper cylinder-head portion 6 is achieved without using the primary pump 11 or an additional pump which is assigned to the high-temperature cooling circuit, secondly, the heat thus obtained is used to heat the charge air via the charge-air cooler 42. The above-described problems as a result of condensing moisture can thus be mitigated.

Turning now to FIG. 4 shows a second embodiment 400 of the cooling system 100 according to the disclosure, which is substantially identical to the cooling system 100 shown in FIGS. 2 and 3 and thus is not described again. For the sake of simplicity, only the cold-start mode is shown here. By contrast with the first embodiment, the first and second circuit branches 12, 30 are not connected to the primary pump 11 via separate connections 13, 31, but via a single primary connection 13. In this respect, this embodiment can be considered to be simplified by comparison with the first embodiment. The embodiments do not differ from one another with respect to the function within the cold-start mode; separate control of the coolant flows in the first circuit branch 12 and in the second circuit branch 30 only in the normal mode is possible in the first embodiment, whereas this is not possible in the second embodiment.

In the example of the cooling system 100 shown in FIGS. 2, 3 and 4, the first connecting line 50 branches off from the second circuit branch 30 in each case between the exhaust gas recirculation valve 33 and the exhaust gas recirculation cooler 34. Alternatively, however, the branch could also be arranged between the exhaust gas recirculation cooler 34 and the HVAC system 35, or also downstream of the HVAC system 35.

Figure 5:
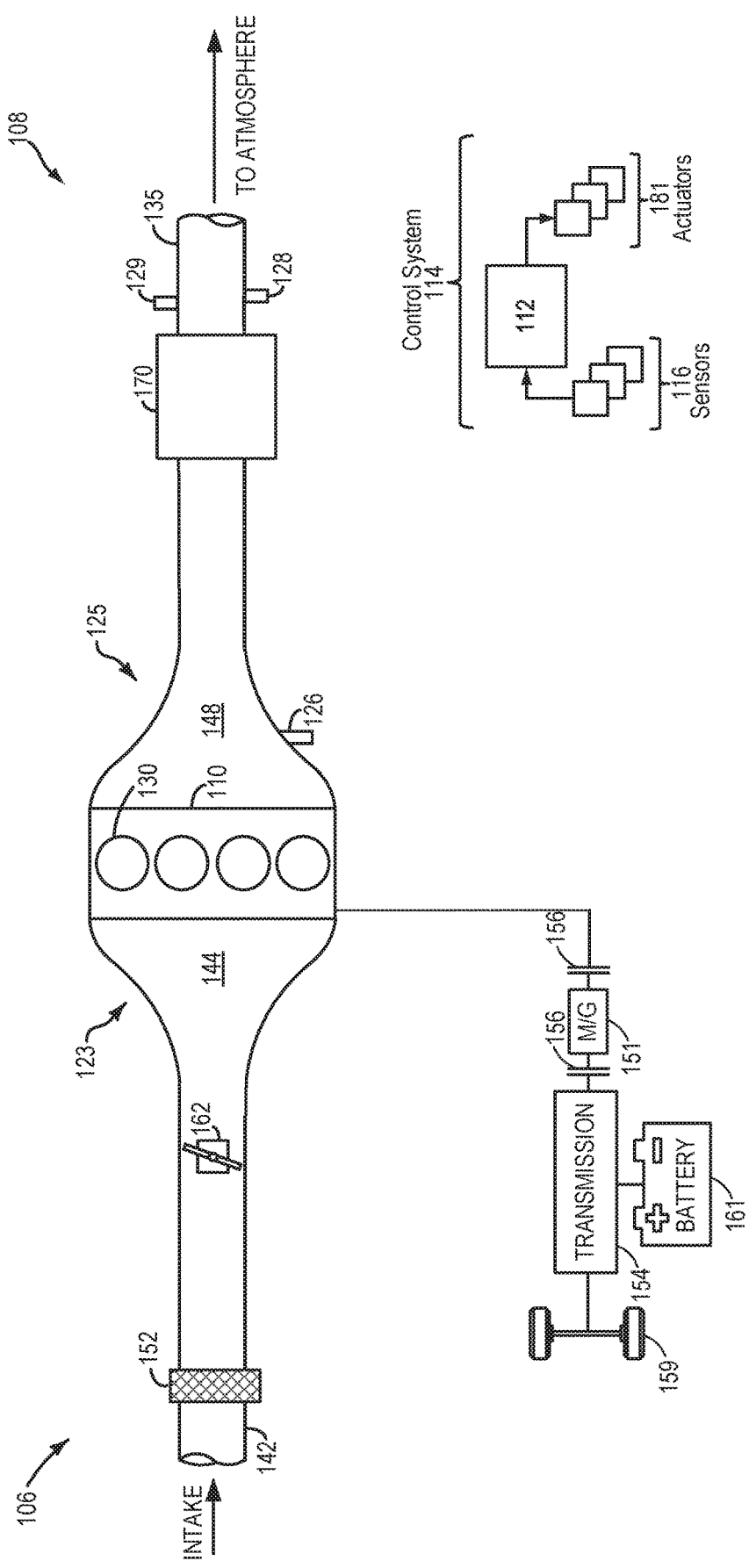
FIG. 5 shows a schematic of an engine of a hybrid vehicle.
Figure 6:
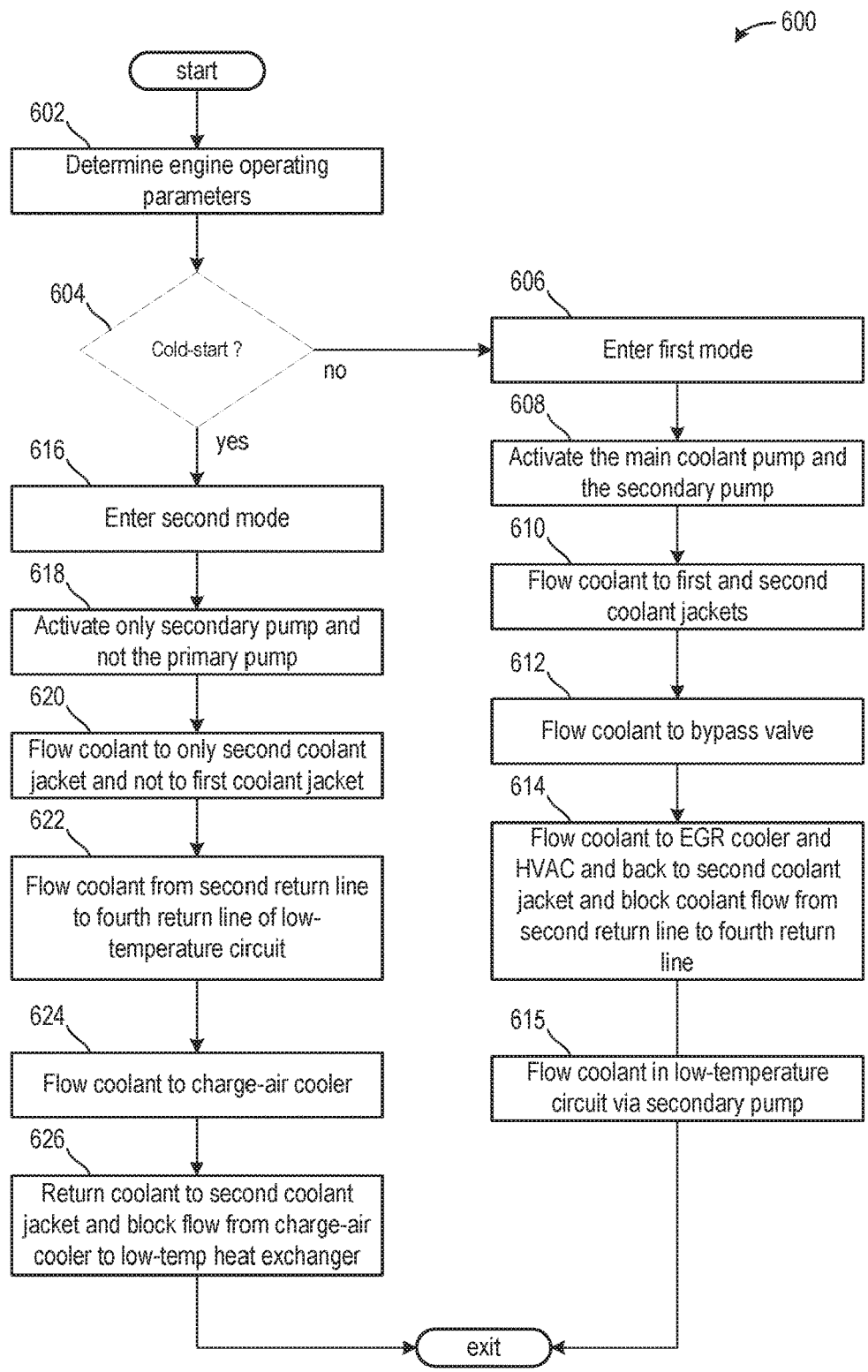
FIG. 6 illustrates a method for operating the cooling system of FIGS. 2, 3, and 4.

FIG. 5 shows a schematic depiction of a hybrid vehicle system 106 that can derive propulsion power from engine system 108 and/or an on-board energy storage device. An energy conversion device, such as a generator, may be operated to absorb energy from vehicle motion and/or engine operation, and then convert the absorbed energy to an energy form suitable for storage by the energy storage device. Engine system 10 may be used similarly to engine system Engine system 108 may include an engine 110 having a plurality of cylinders 130. Engine 110 includes an engine intake 123 and an engine exhaust 125. Engine intake 123 includes an air intake throttle 162 fluidly coupled to the engine intake manifold 144 via an intake passage 142. Air may enter intake passage 142 via air filter 152. Engine exhaust 125 includes an exhaust manifold 148 leading to an exhaust passage 135 that routes exhaust gas to the atmosphere. Engine exhaust 125 may include one or more emission control devices 170 mounted in a close-coupled position or in a far underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 108 is a boosted engine system, the engine system may further include a boosting device, such as a turbocharger (not shown).

Vehicle system 106 may further include control system 114. Control system 114 is shown receiving information from a plurality of sensors 116 (various examples of which are described herein) and sending control signals to a plurality of actuators 181 (various examples of which are described herein). As one example, sensors 116 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 106. As another example, the actuators may include the throttle 162.

Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In one example, the controller 112 may adjust operation of one or more of the primary pump 11, the secondary pump 41, the bypass directional valve 17, the first directional valve 52, the second directional valve 53, the controllable primary connection 13, the controllable secondary connection 31, and the non-return valve 22. In one example, the primary pump 11 may be deactivated and the secondary pump 41 may be activated in response to a cold-start occurring, which may be sensed via a coolant temperature sensor and/or an engine temperature sensor. Furthermore, during the cold-start, the controller 112 may signal to the first directional valve to permit flow of coolant from the second return line of the high temperature cooling circuit to the fourth return line via the first connecting line. Additionally, the controller 112 may signal to the second directional valve to allow coolant to flow to the second connecting line and not to a supply line to the low-temperature heat exchanger.

Outside of the cold-start, the controller 112 may signal to the bypass directional valve to flow coolant to the high-temperature heat exchanger if a coolant temperature is greater than a threshold coolant temperature. However, if the coolant temperature is not greater than the threshold coolant temperature, then the controller 112 may signal to the bypass directional valve to flow coolant through the bypass line and to the first return line.

In some examples, hybrid vehicle 106 comprises multiple sources of torque available to one or more vehicle wheels 159. In other examples, vehicle 106 is a conventional vehicle with only an engine, or an electric vehicle with only electric machine(s). In the example shown, vehicle 106 includes engine 110 and an electric machine 151. Electric machine 151 may be a motor or a motor/generator. A crankshaft of engine 110 and electric machine 151 may be connected via a transmission 154 to vehicle wheels 159 when one or more clutches 156 are engaged. In the depicted example, a first clutch 156 is provided between a crankshaft and the electric machine 151, and a second clutch 156 is provided between electric machine 151 and transmission 154. Controller 112 may send a signal to an actuator of each clutch 156 to engage or disengage the clutch, so as to connect or disconnect crankshaft from electric machine 151 and the components connected thereto, and/or connect or disconnect electric machine 151 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 151 receives electrical power from a traction battery 161 to provide torque to vehicle wheels 159. Electric machine 151 may also be operated as a generator to provide electrical power to charge battery 161, for example during a braking operation.

Turning now to FIG. 6, it shows a method 600 for adjusting coolant flow in response to an engine cold-start. Instructions for carrying out method 600 may be executed by a controller based on instructions stored on a memory of the controller and in conjunction with signals received from sensors of the engine system, such as the sensors described above with reference to FIG. 5. The controller may employ engine actuators of the engine system to adjust engine operation, according to the method described below.

Method 600 begins at 602, which includes determining, estimating, and/or measuring one or more current engine operating parameters. Current engine operating parameters may include one or more of a manifold vacuum, throttle position, engine temperature, engine speed, vehicle speed, EGR flow rate, and air/fuel ratio. Current engine operating parameters may be directly sensed via feedback from one or more sensors described above with respect to FIG. 5 or may be estimated based on the feedback.

The method 600 proceeds to 604, which includes determining if a cold-start is occurring. A cold-start may be occurring if a temperature of the engine or an aftertreatment device, such as an oxidation catalyst, is below a desired operating temperature. Additionally or alternatively, if the engine temperature is equal to an ambient temperature, then a cold-start may be occurring.

If a cold-start is not occurring and an engine temperature is equal to a desired operating temperature or is within a desired operating temperature range, then the method 600 proceeds to 606, which includes entering a first mode. In one example, the first mode is identical to the normal mode as described above with respect to FIG. 2. As such, the first mode includes operation of a cooling arrangement where a cold-start is not occurring. In this way, the first mode (e.g., the normal mode) is a mode where operation of the engine is occurring outside of the cold-start.

The method 600 proceeds to 608, which includes activating only the main coolant pump and not the secondary coolant pump. As such, coolant may flow through each of the first circuit branch and the second circuit branch.

The method 600 proceeds to 610, which includes flowing coolant to the first coolant jacket via the first circuit branch and to the second coolant jacket via the second circuit branch. As described above, the first coolant jacket may be a coolant jacket configured to thermally communicate with the engine block and a lower cylinder-head portion. The second coolant jacket may be a coolant jacket configured to thermally communicate with only an upper cylinder-head portion.

The method 600 proceeds to 612, which includes flowing coolant to a bypass valve (e.g., bypass valve 17). For example, the bypass valve may be a temperature actuated valve, wherein an actuator arranged therein may be adjusted in response to a temperature of coolant flowing to the bypass valve from the first coolant jacket. If the temperature of the coolant is greater than a threshold first coolant jacket temperature, then the bypass valve is switched to a non-bypass position wherein the coolant is directed to a high-temperature heat exchanger via a heat-exchanger line (e.g., heat exchanger line 18 of FIG. 2). As such, a temperature of the coolant may be reduced before returning to the primary pump (e.g., primary pump 11 of FIG. 2).

The method 600 proceeds to 614, which includes flowing coolant to an EGR cooler (e.g., EGR cooler 34 of FIG. 2) and to an HVAC system (e.g., HVAC 35 of FIG. 2) and back to the second coolant jacket via a second return line. A first three-way valve (e.g., first directional valve 52) may be switched to a position configured to block coolant flow from the second return line to the fourth return line by closing the first connecting line. As such, coolant in the second return line may not mix with coolant in the fourth return line. However, coolant from the different lines may mix at the primary pump (e.g., at the intersection between the first returning line and the second return line directly updated of the third return line). By blocking flow of coolant from the second return line, through the first connecting line, and to the fourth return line, the secondary pump may be deactivated and coolant flow to the charge-air cooler may be blocked.

Returning to 604, if a cold-start is occurring, then the method 600 proceeds to 616 enter a second mode. In one example, the second mode is identical to the cold-start mode described above with respect to FIG. 3.

The method 600 proceeds to 618, which includes activating only the secondary pump and not the primary pump. As such, coolant flow may only be dictated via operation of the secondary pump (e.g., secondary pump 41).

The method 600 proceeds to 620, which includes flowing coolant to only the second coolant jacket and not to the first coolant jacket. As such, coolant in the second coolant jacket may be heated via the upper cylinder-head portion, wherein the waste heat from the upper cylinder head portion may be used to heat other portions of the engine system, such as a charge-air cooler. In this way, condensate formation and/or a likelihood thereof may be reduced.

By deactivating the primary pump, energy consumption during the cold-start may be reduced relative to operations that include only a primary pump. By doing this, emissions during the cold-start may be reduced while the second mode may further aim to accelerate heating of the engine to decrease the cold-start duration.

The method 600 proceeds to 622, which includes flowing coolant from the second return line to the fourth return line. As such, the first three-way valve may be adjusted to a position such that coolant from the second return line may flow through the first connecting line and to the fourth return line. In this way, the charge-air cooler arranged along the fourth return line may be heated more quickly by receiving the coolant in the low-temperature circuit, thereby decreasing a condensate risk.

The method 600 proceeds to 624, which includes flowing coolant to the charge-air cooler. The charge-air cooler may be heated via the relatively hot coolant due to the coolant flowing through only the upper-cylinder head portion, where temperatures may be hotter relative to other portions of the engine during a cold-start. In this way, heat may be effectively utilized during the cold-start to heat the engine and the charge-air cooler. By doing this, a contamination of the charge-air cooler may be mitigated.

In one example, the first connecting line 50 may branch from downstream of the EGR cooler along the second return line. As such, coolant may flow through the EGR valve and the EGR cooler before flowing through the first connecting line to the fourth return line and to the charge-air cooler. In this way, a likelihood of condensate formation in each of the charge-air cooler and EGR cooler during a cold-start may be decreased.

The method 600 proceeds to 626, which includes returning coolant to the second coolant jacket. Additionally or alternatively, the method may further include blocking coolant flow from the charge-air cooler to the low-temperature heat exchanger during the cold-start as it may be undesired to cool the coolant in the low-temperature circuit. A position of the second 3/2-way valve may be adjusted to allow coolant flow from the fourth return line to the second connecting line, where coolant may return directly to the upper cylinder-head portion. As such, the coolant does not enter the third return line and remains separate from the coolant in the high-temperature coolant loop and the primary pump.

In this way, a cooling arrangement is configured to flow coolant to only an upper portion of a cylinder head during a cold-start, the upper portion separated from the cylinder block and other portions of the head. The technical effect of flowing coolant to only the upper portion during the cylinder head is to accelerate heating of the charge-air cooler system with waste heat from the upper portion. Additionally, cost, weight, and complexity are reduced as an additional pump is not needed to drive the flow of cooling in the upper portion. Furthermore, a smaller, secondary pump arranged in the low-temperature circuit may be used to drive the flow of coolant, allowing a primary pump to be deactivated, thereby decreasing power consumption and power losses due to operation of the larger, primary pump.

In another representation, a cooling system for an internal combustion engine, comprises a high-temperature cooling circuit, which has a primary pump, a first circuit branch for cooling an engine block and a first cylinder head portion and a second circuit branch for cooling a second cylinder head portion, and has a low-temperature cooling circuit which has a secondary pump and a charge-air cooler, a coolant flow through the first circuit branch being interrupted in a cold-start mode, wherein in the cold-start mode, the second circuit branch is connected to the low-temperature cooling circuit to produce a coolant flow from the second cylinder-head portion to the charge-air cooler via the secondary pump.

A first example of the cooling system further includes where in the cold-start mode, the primary pump is deactivated.

A second example of the cooling system, optionally including the first example, further includes where a first connecting line branches off from the second circuit branch downstream of the second cylinder-head portion and opens into a first directional valve which is arranged in the low-temperature cooling circuit upstream of the secondary pump and the charge-air cooler, and a second connecting line branches off from a second directional valve downstream of the secondary pump and the charge-air cooler and opens into the second circuit branch upstream of the first cylinder-head portion.

A third example of the cooling system, optionally including one or more of the previous examples, further includes where in the cold-start mode, a coolant flow between the charge-air cooler and a low-temperature heat exchanger of the low-temperature cooling circuit through the first and second directional valves is interrupted, whereas a coolant flow through the connecting lines is released.

A fourth example of the cooling system, optionally including one or more of the previous examples, further includes where the first circuit branch has a third directional valve downstream of the engine block and the first cylinder-head portion, by means of which valve coolant flows, which flow firstly through a high-temperature heat exchanger and secondly through a bypass line bypassing the high-temperature heat exchanger can be changed.

A fifth example of the cooling system, optionally including one or more of the previous examples, further includes where the primary pump has a controllable primary connection for the first circuit branch and a controllable secondary connection for the second circuit branch.

A sixth example of the cooling system, optionally including one or more of the previous examples, further includes where the primary pump has a controllable primary connection for the first circuit branch and for the second circuit branch.

A seventh example of the cooling system, optionally including one or more of the previous examples, further includes where the first circuit branch and the second circuit branch are interconnected downstream of the primary pump via a non-return valve which opens to the second circuit branch.

An eighth example of the cooling system, optionally including one or more of the previous examples, further includes where the second circuit branch passes through an exhaust gas recirculation valve, an exhaust gas recirculation cooler, and/or a HVAC system.

A ninth example of the cooling system, optionally including one or more of the previous examples, further includes where the first connecting line branches off from the second circuit branch downstream of the exhaust gas recirculation cooler, and/or downstream of the HVAC system.

An embodiment of a cooling arrangement for an engine comprises a high-temperature cooling circuit comprising a primary pump and a low-temperature coolant circuit comprising a secondary pump smaller than the primary pump, and a controller with computer-readable instructions stored on non-transitory memory thereof that when executed enable the controller to activate the secondary pump and deactivate the primary pump during an engine cold-start, wherein coolant only flows through an upper cylinder-head portion separate from coolant jackets of the engine block and a lower cylinder-head portion.

A first example of the cooling arrangement further comprises where coolant flows from the upper cylinder-head portion, through an EGR valve, and to a charge-air cooler arranged in the low-temperature coolant circuit before it returns to the upper cylinder-head portion.

A second example of the cooling arrangement, optionally including the first example, further includes where coolant flows from the upper cylinder-head portion, through an EGR valve, through an EGR cooler, and to a charge-air cooler arranged in the low-temperature coolant circuit before it returns to the upper cylinder-head portion.

A third example of the cooling arrangement, optionally including one or more of the previous examples, further includes where coolant flows from the upper cylinder-head portion, through an EGR valve, through an EGR cooler, through an HVAC system, and to a charge-air cooler arranged in the low-temperature coolant circuit before it returns to the upper cylinder-head portion.

A fourth example of the cooling arrangement, optionally including one or more of the previous examples, further includes where the high-temperature coolant circuit comprises a transmission oil cooler, an oil filter, a bypass line, a bypass direction valve and a high-temperature heat exchanger arranged along a first circuit branch of the high-temperature coolant circuit.

A fifth example of the cooling arrangement, optionally including one or more of the previous examples, further includes where the high-temperature coolant circuit comprises the EGR valve, the EGR cooler, and the HVAC system arranged along a second circuit branch of the high-temperature coolant circuit.

A sixth example of the cooling arrangement, optionally including one or more of the previous examples, further includes where a connecting line fluidly connects the second circuit branch to the low-temperature coolant circuit at a location downstream of the HVAC system.

An embodiment of a cooling system for an internal combustion engine comprises a high-temperature cooling circuit comprising a primary pump for cooling only an engine block and only a first cylinder head portion separate from a second cylinder head portion, the first cylinder head portion closer to the engine block than the second cylinder head portion and a low-temperature cooling circuit comprising a secondary pump and a charge-air cooler, wherein the secondary pump is configured to flow coolant to only the second cylinder head portion and the charge-air cooler in response to an engine temperature being less than a threshold temperature.

A first example of the cooling system further includes where the threshold temperature is equal to a cold-start temperature, and where the primary pump is deactivated during a cold-start.

A second example of the cooling system, optionally including the first example, further includes where the high-temperature cooling circuit comprises a first circuit comprising a bypass valve and a high-temperature heat exchanger, wherein the bypass valve is configured to direct coolant to the high-temperature heat exchanger in response to a coolant temperature exceeding a threshold high-temperature or directly to the primary pump in response to the coolant temperature being less than or equal to the threshold high-temperature.

A third example of the cooling system, optionally including one or more of the previous examples, further includes where the high-temperature cooling circuit further comprises a second circuit comprising an EGR valve, an EGR cooler, and an HVAC system, wherein a first return line of the first circuit and a second return line of the second circuit merge and flow a mixed coolant flow to the primary pump via a third return line.

A fourth example of the cooling system, optionally including one or more of the previous examples, further includes where a first connecting line branches off from the second return line of the second circuit at a location downstream of the EGR valve and opens to a first directional valve arranged in the low-temperature cooling circuit upstream of the secondary pump and the charge-air cooler, and wherein a second connecting line branches off from a second directional valve downstream of the secondary pump and the charge-air cooler and opens directly into the second cylinder head portion A fifth example of the cooling system, optionally including one or more of the previous examples, further includes where the low-temperature cooling circuit comprises a low-temperature heat exchanger, and where a position of the first and second directional valves is switched to block coolant flow to the low-temperature heat exchanger in response to the engine temperature being less than the threshold temperature, and where the position of the first and second directional valves is switched to allow coolant flow to the low-temperature heat exchanger in response to the engine temperature being greater than or equal to the threshold temperature.

A sixth example of the cooling system, optionally including one or more of the previous examples, further includes where the location is further downstream of the EGR cooler and upstream of the HVAC system.

A seventh example of the cooling system, optionally including one or more of the previous examples, further includes where the primary pump comprises a controllable primary connection configured to flow coolant through the first circuit and a controllable secondary connection configured to flow coolant through the second circuit.

An eighth example of the cooling system, optionally including one or more of the previous examples, further includes where a non-return valve arranged in the second circuit upstream of the second cylinder-head portion, wherein the non-return valve is adjustable and configured to direct coolant from the second circuit to the first circuit.

A ninth example of the cooling system, optionally including one or more of the previous examples, further includes where the second return line is fluidly coupled to the second circuit at a location directly upstream of each of the second cylinder-head portion and the non-return valve.

An embodiment of a method comprises flowing coolant to only an upper cylinder-head portion and not to a lower cylinder-head portion and a cylinder block in response to a cold-start being present, wherein flowing coolant comprises directing the coolant via a secondary pump arranged in a low-temperature cooling circuit and flowing coolant to the upper cylinder-head portion, the lower-cylinder head portion, and the cylinder block in response to the cold-start not being present, wherein a primary pump arranged in a high-temperature cooling circuit directs coolant through a first circuit to the lower-cylinder head portion and the cylinder block.

A first example of the method further includes where flowing coolant from the primary pump to the first circuit via a first connection adjusted to fluidly couple the primary pump to the first circuit, and wherein flowing coolant from the primary pump to the second circuit comprises adjusting a second connect to fluidly couple the primary pump to the second circuit, wherein the second circuit directs coolant to the upper cylinder-head portion and to an EGR valve, an EGR cooler, and an HVAC system.

A second example of the method, optionally including the first example, further includes where deactivating the primary pump in response to the cold-start being present, wherein the second circuit is fluidly coupled to the low-temperature cooling circuit at a location downstream of the EGR valve and upstream of the EGR cooler.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A cooling arrangement for an engine, comprising:
a high-temperature cooling circuit comprising a primary pump and a low-temperature coolant circuit comprising a secondary pump smaller than the primary pump; and
a controller with computer-readable instructions stored on non-transitory memory thereof that when executed enable the controller to:
activate the secondary pump and deactivate the primary pump during an engine cold-start, wherein coolant only flows through an upper cylinder-head portion separate from coolant jackets of the engine block and a lower cylinder-head portion.

2. The cooling arrangement of claim 1, wherein coolant flows from the upper cylinder-head portion, through an EGR valve, and to a charge-air cooler arranged in the low-temperature coolant circuit before it returns to the upper cylinder-head portion.

3. The cooling arrangement of claim 1, wherein coolant flows from the upper cylinder-head portion, through an EGR valve, through an EGR cooler, and to a charge-air cooler arranged in the low-temperature coolant circuit before it returns to the upper cylinder-head portion.

4. The cooling arrangement of claim 1, wherein coolant flows from the upper cylinder-head portion, through an EGR valve, through an EGR cooler, through an HVAC system, and to a charge-air cooler arranged in the low-temperature coolant circuit before it returns to the upper cylinder-head portion.

5. The cooling arrangement of claim 4, wherein the high-temperature coolant circuit comprises a transmission oil cooler, an oil filter, a bypass line, a bypass direction valve and a high-temperature heat exchanger arranged along a first circuit branch of the high-temperature coolant circuit.

6. The cooling arrangement of claim 5, wherein the high-temperature coolant circuit comprises the EGR valve, the EGR cooler, and the HVAC system arranged along a second circuit branch of the high-temperature coolant circuit.

7. The cooling arrangement of claim 6, wherein a connecting line fluidly connects the second circuit branch to the low-temperature coolant circuit at a location downstream of the HVAC system.

8. A cooling system for an internal combustion engine, comprising:
- a high-temperature cooling circuit comprising a primary pump for cooling only an engine block and only a first cylinder head portion separate from a second cylinder head portion, the first cylinder head portion closer to the engine block than the second cylinder head portion; and
- a low-temperature cooling circuit comprising a secondary pump and a charge-air cooler, wherein the secondary pump is configured to flow coolant to only the second cylinder head portion and the charge-air cooler in response to an engine temperature being less than a threshold temperature.

9. The cooling system of claim 8, wherein the threshold temperature is equal to a cold-start temperature, and where the primary pump is deactivated during a cold-start.

10. The cooling system of claim 8, wherein the high-temperature cooling circuit comprises a first circuit comprising a bypass valve and a high-temperature heat exchanger, wherein the bypass valve is configured to direct coolant to the high-temperature heat exchanger in response to a coolant temperature exceeding a threshold high-temperature or directly to the primary pump in response to the coolant temperature being less than or equal to the threshold high-temperature.

11. The cooling system of claim 10, wherein the high-temperature cooling circuit further comprises a second circuit comprising an EGR valve, an EGR cooler, and an HVAC system, wherein a first return line of the first circuit and a second return line of the second circuit merge and flow a mixed coolant flow to the primary pump via a third return line.

12. The cooling system of claim 11, wherein a first connecting line branches off from the second return line of the second circuit at a location downstream of the EGR valve and opens to a first directional valve arranged in the low-temperature cooling circuit upstream of the secondary pump and the charge-air cooler, and wherein a second connecting line branches off from a second directional valve downstream of the secondary pump and the charge-air cooler and opens directly into the second cylinder head portion.

13. The cooling system of claim 12, wherein the low-temperature cooling circuit comprises a low-temperature heat exchanger, and where a position of the first and second directional valves is switched to block coolant flow to the low-temperature heat exchanger in response to the engine temperature being less than the threshold temperature, and where the position of the first and second directional valves is switched to allow coolant flow to the low-temperature heat exchanger in response to the engine temperature being greater than or equal to the threshold temperature.

14. The cooling system of claim 12, wherein the location is further downstream of the EGR cooler and upstream of the HVAC system.

15. The cooling system of claim 12, wherein the primary pump comprises a controllable primary connection configured to flow coolant through the first circuit and a controllable secondary connection configured to flow coolant through the second circuit.

16. The cooling system of claim 15, further comprising a non-return valve arranged in the second circuit upstream of the second cylinder-head portion, wherein the non-return valve is adjustable and configured to direct coolant from the second circuit to the first circuit.

17. The cooling system of claim 16, wherein the second return line is fluidly coupled to the second circuit at a location directly upstream of each of the second cylinder-head portion and the non-return valve.

18. A method, comprising:
- flowing coolant to only an upper cylinder-head portion and not to a lower cylinder-head portion and a cylinder block in response to a cold-start being present, wherein flowing coolant comprises directing the coolant via a secondary pump arranged in a low-temperature cooling circuit; and
- flowing coolant to the upper cylinder-head portion, the lower-cylinder head portion, and the cylinder block in response to the cold-start not being present, wherein a primary pump arranged in a high-temperature cooling circuit directs coolant through a first circuit to the lower-cylinder head portion and the cylinder block.

19. The method of claim 18, further comprising flowing coolant from the primary pump to the first circuit via a first connection adjusted to fluidly couple the primary pump to the first circuit, and wherein flowing coolant from the primary pump to the second circuit comprises adjusting a second connect to fluidly couple the primary pump to the second circuit, wherein the second circuit directs coolant to the upper cylinder-head portion and to an EGR valve, an EGR cooler, and an HVAC system.

20. The method of claim 18, further comprising deactivating the primary pump in response to the cold-start being present, wherein the second circuit is fluidly coupled to the low-temperature cooling circuit at a location downstream of the EGR valve and upstream of the EGR cooler.

* * * * *